United States Patent
Knott et al.

(10) Patent No.: US 12,060,460 B2
(45) Date of Patent: Aug. 13, 2024

(54) PROCESS FOR PRODUCING ENDCAPPED, LIQUID SILOXANES FROM SILICONE WASTES

(71) Applicant: Evonik Operations GmbH, Essen (DE)

(72) Inventors: Wilfried Knott, Essen (DE); Horst Dudzik, Essen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/724,560

(22) Filed: Apr. 20, 2022

(65) Prior Publication Data

US 2022/0348721 A1    Nov. 3, 2022

(30) Foreign Application Priority Data

Apr. 29, 2021    (EP) .................................... 21171175

(51) Int. Cl.
     *C08G 77/08*    (2006.01)
     *C08G 77/18*    (2006.01)
     *C08G 77/24*    (2006.01)

(52) U.S. Cl.
     CPC ............. *C08G 77/08* (2013.01); *C08G 77/18* (2013.01); *C08G 77/24* (2013.01)

(58) Field of Classification Search
None
See application file for complete search history.

(56) References Cited

U.S. PATENT DOCUMENTS

| | | | |
|---|---|---|---|
| 5,110,972 A * | 5/1992 | Greenlee ................... | C07F 7/21 556/460 |
| 5,371,161 A | 12/1994 | Knott | |
| 5,455,367 A | 10/1995 | Klein et al. | |
| 5,491,249 A * | 2/1996 | Kostas ................... | C07F 7/0876 556/460 |
| 5,647,914 A * | 7/1997 | Goto ....................... | B01D 12/00 134/40 |
| 5,783,609 A * | 7/1998 | Cho .......................... | C07F 7/20 528/12 |
| 5,856,548 A | 1/1999 | Dröse et al. | |
| 5,892,087 A * | 4/1999 | Yang ...................... | C08G 77/38 556/467 |
| 6,172,253 B1 * | 1/2001 | Kawamoto ............. | C07F 7/089 556/466 |
| 6,307,082 B1 | 10/2001 | Klein et al. | |
| 6,652,665 B1 | 11/2003 | Sachdev et al. | |
| 7,157,541 B2 | 1/2007 | Knott et al. | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,645,848 B2 | 1/2010 | Knott et al. | |
| 7,754,778 B2 | 7/2010 | Knott et al. | |
| 7,825,205 B2 | 11/2010 | Knott et al. | |
| 7,825,206 B2 | 11/2010 | Neumann et al. | |
| 7,825,209 B2 | 11/2010 | Knott et al. | |
| 8,283,422 B2 | 10/2012 | Schubert et al. | |
| 8,309,664 B2 | 11/2012 | Knott et al. | |
| 8,309,673 B2 | 11/2012 | Schubert et al. | |
| 8,324,325 B2 | 12/2012 | Knott et al. | |
| 8,334,355 B2 | 12/2012 | Henning et al. | |
| 8,420,748 B2 | 4/2013 | Henning et al. | |
| 8,598,295 B2 | 12/2013 | Henning et al. | |
| 8,623,984 B2 | 1/2014 | Henning et al. | |
| 8,722,834 B2 | 5/2014 | Knott et al. | |
| 8,779,079 B2 | 7/2014 | Henning et al. | |
| 8,802,744 B2 | 8/2014 | Knott et al. | |
| 8,946,369 B2 | 2/2015 | Henning et al. | |
| 8,969,502 B2 | 3/2015 | Knott et al. | |
| 8,974,627 B2 | 3/2015 | Schubert et al. | |
| 9,068,044 B2 | 6/2015 | Schubert et al. | |
| 9,315,614 B2 | 4/2016 | Schubert et al. | |
| 9,540,500 B2 | 1/2017 | Ferenz et al. | |
| 9,975,909 B2 | 5/2018 | Schubert et al. | |
| 10,399,998 B2 | 9/2019 | Knott et al. | |
| 10,414,872 B2 | 9/2019 | Knott et al. | |
| 10,519,280 B2 | 12/2019 | Knott et al. | |
| 10,526,454 B2 | 1/2020 | Knott et al. | |
| 10,752,735 B2 | 8/2020 | Knott et al. | |

(Continued)

FOREIGN PATENT DOCUMENTS

| | | |
|---|---|---|
| DE | 10 2014 211 680 | 2/2015 |
| EP | 0 514 737 | 11/1992 |

(Continued)

OTHER PUBLICATIONS

D. Zhu et al., 21 Journal of Materials Chemistry, 6584-6594 (2011) (Year: 2011).*
B. Rupasinghe et al., Polym. Int, 521-531 (2022) (Year: 2022).*
B. Rupasinghe et al., Applied Polymer Materials (2021) (Year: 2021).*
P. Dohlert et al., 3 ACS Sustainable Chemistry & Engineering, 163-169 (2015) (Year: 2015).*
S. Enthaler Journal of Applied Polymer Science, 1-8 (2015) (Year: 2015).*
D. Krug et al., 4 ACS Omega, 3782-3789 (2019) (Year: 2019).*
Z. Han et al., Organosilicon Compounds as Polymer Fire Retardants, in Polymer Green Flame Retardants, 389-418 (2014) (Year: 2014).*
Dow Corning Corporation, Silicone Chemistry Overview, 1-11 (1997) (Year: 1997).*
A. Colas et al., Handbook of Polymer Applications in Medicine and Medical Devices, 131-143 (2013) (Year: 2013).*
European Search Report and Search Opinion for corresponding European application EP 21 17 1175, filed Apr. 29, 2021, with partial English language machine translation of the Search Opinion attached.

(Continued)

*Primary Examiner* — Alexander R Pagano

(74) *Attorney, Agent, or Firm* — Law Office of: Michael A. Sanzo, LLC

(57) ABSTRACT

Process for producing endcapped, liquid siloxanes having chain lengths of greater than 3 silicon atoms from end-of-life silicones, especially from silicone elastomers and/or silicone rubbers, by acid-catalysed depolymerization thereof in a solvent-free reaction system comprising at least one compound providing end groups $M^R$, at least one compound providing D units, and at least one Brønsted acid.

17 Claims, No Drawings

(56) References Cited

U.S. PATENT DOCUMENTS

| | | |
|---|---|---|
| 10,766,913 B2 | 9/2020 | Knott et al. |
| 10,954,344 B2 | 3/2021 | Knott et al. |
| 11,021,575 B2 | 6/2021 | Knott et al. |
| 11,066,429 B2 | 7/2021 | Knott et al. |
| 11,220,578 B2 | 1/2022 | Knott et al. |
| 11,261,298 B2 | 3/2022 | Favresse et al. |
| 11,279,804 B2 | 3/2022 | Knott et al. |
| 11,286,351 B2 | 3/2022 | Knott et al. |
| 11,286,366 B2 | 3/2022 | Knott et al. |
| 11,332,591 B2 | 5/2022 | Hermann et al. |
| 11,345,783 B2 | 5/2022 | Knott et al. |
| 11,359,056 B2 | 6/2022 | Knott et al. |
| 11,377,523 B2 | 7/2022 | Favresse et al. |
| 11,420,985 B2 | 8/2022 | Knott et al. |
| 11,472,822 B2 * | 10/2022 | Knott .................. C08G 77/70 |
| 11,498,996 B2 | 11/2022 | Knott et al. |
| 2009/0137752 A1 | 5/2009 | Knott et al. |
| 2010/0012623 A1 | 1/2010 | Mignani et al. |
| 2010/0081781 A1 | 4/2010 | Schubert et al. |
| 2011/0301254 A1 | 12/2011 | Knott et al. |
| 2013/0213267 A1 | 8/2013 | Fiedel et al. |
| 2013/0345318 A1 | 12/2013 | Schubert et al. |
| 2018/0016392 A1 | 1/2018 | Lobert et al. |
| 2019/0106369 A1 | 4/2019 | Schubert et al. |
| 2020/0339612 A1 | 10/2020 | Knott et al. |
| 2020/0377666 A1 | 12/2020 | Knott et al. |
| 2020/0377686 A1 * | 12/2020 | Knott .................. C08J 11/26 |
| 2021/0130551 A1 | 5/2021 | Knott et al. |
| 2021/0253780 A1 | 8/2021 | Wessely et al. |
| 2021/0253799 A1 | 8/2021 | Knott et al. |
| 2021/0301099 A1 | 9/2021 | Knott et al. |
| 2021/0371598 A1 | 12/2021 | Knott et al. |
| 2022/0033587 A1 | 2/2022 | Knott et al. |
| 2022/0119617 A1 * | 4/2022 | Knott .................. C08G 77/46 |
| 2022/0161158 A1 | 5/2022 | McNaughton et al. |
| 2023/0041322 A1 | 2/2023 | De Gans et al. |
| 2024/0052107 A1 | 2/2024 | Knott et al. |
| 2024/0052108 A1 | 2/2024 | Knott et al. |
| 2024/0052132 A1 | 2/2024 | Knott et al. |

FOREIGN PATENT DOCUMENTS

| | | | |
|---|---|---|---|
| EP | 0 950 684 | 10/1999 | |
| EP | 2626059 A2 * | 8/2013 | .............. A61K 6/10 |
| EP | 3744774 A1 * | 12/2020 | .............. C07F 7/188 |
| JP | H 04-318075 | 11/1992 | |
| WO | WO 2008/097306 | 8/2008 | |
| WO | WO 2013/010747 | 1/2013 | |
| WO | WO-2014130948 A1 * | 8/2014 | .............. C08J 11/16 |
| WO | WO-2022165305 A1 * | 8/2022 | |

OTHER PUBLICATIONS

Krug, et al., "Facile Approach to Recycling Highly Cross-Linked Thermoset Silicone Resins under Ambient Conditions," *ACS Omega* 4:3782-3789 (Feb. 2019).

Rupasinghe and Furgal, "Full Circle Recycling of Polysiloxanes via Room-Temperature Fluoride-Catalyzed Depolymerization to Repolymerizable Cyclics," *ACS Applied Polymer Materials* (4):1828-1839 (Apr. 2021).

Vollmer, et al., "Beyond Mechanical Recycling: Giving New Life to Plastic Waste," *Angew. Chem. Int. Ed.* 59:15402-15423 (2020).

U.S. Appl. No. 16/759,413, filed Apr. 27, 2020, US-2020/0339612 A1, Oct. 29, 2020, Knott.

U.S. Appl. No. 16/851,385, filed Apr. 17, 2020, US-2020/0377666 A1, Dec. 3, 2020, Knott.

U.S. Appl. No. 17/142,802, filed Jan. 6, 2021, US-2021/0253780 A1, Aug. 19, 2021, Wessely.

U.S. Appl. No. 17/145,558, filed Jan. 11, 2021, US-2021/0253799 A1, Aug. 19, 2021, Knott.

U.S. Appl. No. 17/147,592, filed Jan. 13, 2021, US-2021/0130551 A1, May 6, 2021, Knott.

U.S. Appl. No. 17/177,489, filed Feb. 17, 2021, US-2021/0301099 A1, Sep. 30, 2021, Knott.

U.S. Appl. No. 17/239,011, filed Apr. 23, 2021, US-2021/0371598 A1, Dec. 2, 2021, Knott.

U.S. Appl. No. 17/297,372, filed May 26, 2021, US-2022/0033587 A1, Feb. 3, 2022, Knott.

U.S. Appl. No. 17/476,417, filed Sep. 15, 2021, US-2022/0119617 A1, Apr. 21, 2022, Knott.

U.S. Appl. No. 17/812,087, filed Jul. 12, 2022, US-2024/0041333 A1, Feb. 9, 2023, De Gans.

U.S. Appl. No. 18/447,527, filed Aug. 10, 2023, US-2024/0052108 A1, Feb. 15, 2024, Knott.

U.S. Appl. No. 18/447,540, filed Aug. 10, 2023, US-2024/0052132 A1, Feb. 15, 2024, Knott.

U.S. Appl. No. 18/447,558, filed Aug. 10, 2023, US-2024/0052107 A1, Feb. 15, 2024, Knott.

* cited by examiner

PROCESS FOR PRODUCING ENDCAPPED, LIQUID SILOXANES FROM SILICONE WASTES

CROSS REFERENCE TO RELATED APPLICATIONS

The present application claims priority under 35 USC § 119 to European application EP 21171175, filed on Apr. 29, 2021, the contents of which is incorporated herein by reference in its entirety.

The present invention is in the field of silicones and in particular relates to a process for producing endcapped, liquid siloxanes such as for example alkoxysiloxanes, hydrogensiloxanes, chlorosiloxanes, polydimethylsiloxanes or vinylsiloxanes from silicone wastes, in particular comprising silicone elastomers and/or silicone rubber, through acid-catalysed depolymerization thereof in a solvent-free reaction system.

In the context of the present invention use is also made of the M, D, T and Q designations for organopolysiloxane constructional units. Provided as a reference for the definition thereof is W. Noll, Chemie und Technologie der Silicone, Verlag Chemie, Weinheim Bergstr., 1960, page 2 ff.

Because of their specific material characteristics, silicone components meet particular demands from a medical, pharmaceutical and food technology viewpoint. They are physiologically entirely inert given appropriate processing. For instance, products made of silicone are encountered in food applications, in medicine and in pharmaceutical sectors. Babies' dummies and pacifiers are produced from silicone, as are divers' goggles. In technical industrial applications, silicone appears in many cases as a material for gaskets or in dynamic applications for membranes. In the automotive sector, it is used for hoses, sheaths or as cable insulation.

Silicone has a crucial advantage in its mechanical properties over other rubber types. In the case of silicone, they are conserved at a relatively stable level over a very wide temperature range, whereas the mechanical properties of many other materials deteriorate significantly under cold or hot conditions. While a look at the technical data sheet for an EPDM material, for example, might suggest it is superior to a silicone mixture in its mechanical properties because it is the properties at room temperature that are stated here, the exact opposite picture is found at high or low temperatures. Thermal stability in air for silicone is from about −80° C. to about 250° C. This property is extensively used for gaskets since the very low compression set that is typical of silicone is manifested here.

On account of their excellent stability to ozone, UV and weathering, silicone mixtures are also commonly used in outdoor applications. In addition, silicone has very low flammability and has both good electrical insulation capacity and good electrical conductivity. Silicone is chemically stable e.g. towards vegetable and animal fats, hot water and alcohol. Stability to acids, alkalis, fuels and ketones, and also to steam is limited. Silicone additionally has very high gas permeability.

As well as industrial applications, silicone has been used for decades as a preferred elastomer in the medical sector. Silicone components are also used as short-term implants (for shorter than 30 days in Class IIa medical devices) or long-term implants (for 30 days or longer in Class IIb medical devices), where they fulfil critical functions in devices such as heart catheters, heart pacemakers, ventilation devices, neurostimulators and defibrillators.

Silicone rubber that is to be used for long-term implants is supplied by only very few producers worldwide (for example by NuSil Technology). Production of the mixtures takes place under strict conditions imposed by the US Food and Drug Administration (FDA). Exceptional purity must likewise be ensured during processing and component production must take place in a cleanroom.

An important advantage of silicone here is that it is biocompatible and hence is well tolerated by humans. The biocompatibility of a silicone mixture is commonly demonstrated by USP Class VI classifications (USP stands for United States Pharmacopeia) or by tests according to the stricter (DIN EN) ISO 10993 standard. (DIN EN) ISO 10993 serves primarily for the testing of medical devices that are implanted in the human body for a long period or permanently. For shorter-term applications, classification according to USP Class VI or possibly a lower classification is sufficient.

In addition, silicone, on account of its property of being usable within a wide temperature range from about −80° C. to about 250° C., offers the option of steam sterilization (heating in an autoclave). Silicone products can thus be freed of live microorganisms, their dormant forms, viruses, etc. The good electrical insulation capabilities of silicone are also of particular significance in the medical sector.

Variation of the silicone rubbers used and of the modes of crosslinking allows silicones to take on particular properties. For instance, HTV silicone rubbers are flexible and stable within a wide temperature range from −50° C. up to 200° C., in some cases up to 300° C. They are found in gaskets in the automotive or food industry, in cable sheaths or as insulation material.

RTV silicone rubbers are valued particularly for their thermal conductivity and electrical insulation capability and are for that reason employed with preference in the electrical and electronics sector.

Liquid silicones (also LSRs, liquid silicone rubbers) have lower viscosity compared with HTV and RTV silicone rubbers. They can be rendered into a wide variety of different shapes by injection moulding and processed for example into silicone hoses. Since LSR silicones are always produced by platinum crosslinking, products based on liquid silicones can be used in medical technology sectors.

By virtue of its high stability within the human body, silicone thus constitutes very good protection of critical components and is additionally used with preference for functional parts on account of the properties mentioned.

The fundamental difference between silicone rubber and other organic elastomers is that its main chains, which have an inorganic structure, do not consist of carbon-carbon bonds but are formed from combinations of silicon and oxygen atoms, with fumed silica in particular used as filler for the development of good properties.

Depending on their physical state and vulcanization temperature, silicone rubbers can be divided into three groups:

Silicone rubbers referred to as HTV (high temperature vulcanizing) or HCR (high consistency rubber) are those having a solid raw material. They are vulcanized at high temperatures typically between 140° C. and 200° C. Crosslinking is effected by peroxides or by an addition reaction using platinum compounds as catalyst.

Liquid silicone or LSR (liquid silicone rubber) as raw material is a (viscous) liquid and consists of two components that are mixed directly prior to processing. Crosslinking is effected by addition reaction at temperatures similar to those for the HTV types, generally with significantly faster crosslinking.

Both silicone types can be coloured. Finished elastomer articles made from HTV silicone and LSR silicone barely differ in their properties.

The third group are what are called RTV (room temperature vulcanizing) silicones. In this type, crosslinking already occurs at room temperature. They are extensively used as adhesive and/or sealant compounds or in prototype manufacture. They are available both as one-component and as two-component systems.

Just as the use properties derivable from the exceptional chemical stability of silicones are advantageous for the service life of the articles manufactured therefrom, the stability thereof is a problem when disposing of silicones at the end of their life cycle (end-of-life silicones/silicone wastes). The terms "silicone wastes" and "end-of-life silicones" are in the context of the present invention to be understood as being synonymous.

Laine et al. in ACS Omega 2019, 4, 3782-3789 describe the efforts that have hitherto been made to introduce silicones into the circular economy. This article (page 3783, top left, lines 1 to 4) states that the chemical recycling of silicones has been directed to depolymerization of silicone liquids and crosslinked silicone rubbers with the aim of obtaining monomers therefrom which may subsequently be (re)polymerized to replace virgin material. While acknowledging the relevant prior art the authors come to the conclusion that no technical solution for real recycling is yet available and profess the desirability of a process allowing virtually quantitative yields while almost completely retaining original properties at a low energy/economic cost. A closed recycling process where the recycled silicone is even returned to the original use is identified as being even more attractive. Downcycling, especially also in the case of silicone resins, i.e. accepting a loss of value of the recovered material as a result of the limited reuse thereof for low value products of lower quality, represents current actual industrial practice. Laine et al. are concerned with producing a specific copolymer of dodecaphenylsilsesquioxane and octamethylcyclotetrasiloxane in tetrahydrofuran through treatment with tetrabutylammonium fluoride with subsequent thermal curing and demonstrate that this material can also be broken down again by treatment with tetrabutylammonium fluoride in THF.

Likewise illuminating the current state of the art of siloxane depolymerization with a view to recycling and reuse and specifically highlighting the peculiarity of the silicone copolymer chosen by Laine et al., J. C. Furgal and B. Rupasinghe, in their review-like article "Full Circle Recycling of Polysiloxanes via Room-Temperature Fluoride-Catalyzed Depolymerization to Repolymerizable Cyclics", ACS Appl. Polymer Materials, Oct. 3, 2021 (https://dx.doi.org/10.2021/asapm.0c011406), address the broad technical challenge of silicone recycling and apply the tetrabutylammonium fluoride catalysis described in Laine to commercial silicones. These depolymerizations also always afford cyclic products (4-, 5-, 6-membered rings).

EP 3744774 A1 likewise explains in detail that the experiments and studies for recycling silicone wastes described in the prior art known to date have yielded only unsatisfactory results. In the absence of an industrially feasible and attractive route for physically recycling both silicone oils and solid silicones, this document proposed a process for recycling silicones through the chemical transformation thereof into siloxanes and/or silanes having acetoxy groups, wherein the silicones to be recycled undergo heat-treatment in digestion systems comprising acetic anhydride and/or an acetoxysiloxane and at least one Brønsted acid, preferably with addition of acetic acid.

Hitherto unpublished European patent application having the application number 20202477.4 describes an upcycling process for producing acidic, end-equilibrated siloxanes bearing acetoxy groups and having chain lengths of greater than 3 silicon atoms from end-of-life silicones, in particular comprising silicone adhesives and/or silicone sealants and/or silicone rubber wastes and/or silicone oil wastes, by thermal digestion of the end-of-life silicones in an acidic reaction medium comprising acetic anhydride, acetic acid and at least one further Brønsted acid having a pKa of <4, the digestion taking place in a reactor having a volume of at least 1 litre. The thus obtained end-equilibrated acetoxy-bearing siloxanes having chain lengths of greater than 3 silicon atoms may be utilized directly as starting material for the synthesis of new high-quality silicone products, in particular for the production of interface-active substances.

As much as the teaching of particularly the two last-mentioned documents represents progress in terms of the addition of value or the retention of value achievable therewith in the silicone material to be recycled, the functionality obtained in the upcyclate/recyclate is limited to the Si-acetoxy function and, as per EP 3744774 A1, supplementary synthetic steps such as for example conversion of the acetoxy function into an OH group or conversion of the acetoxy function into an alkoxy group are required to arrive at further Si-bonded functionalities.

In other words, in light of this prior art, the universality of the recycling process requires improvement with a view to obtaining from siloxane wastes, in only one step and at relatively low energy and economic cost, endcapped siloxanes where the terminal silicon atom of the recyclate bears especially the alkoxy function, the hydrogen function, the chlorine function, the methyl function or the vinyl function.

It has now been found that, surprisingly, it is possible to produce endcapped siloxanes from silicone wastes, preferably from silicone adhesives and/or sealants, and from silicone rubber through acid-catalysed depolymerization thereof into alkoxysiloxanes, hydrogensiloxanes, chlorosiloxanes, polydimethylsiloxanes and/or vinylsiloxanes.

The present invention provides a process for producing endcapped, liquid siloxanes having chain lengths of greater than 3 silicon atoms from silicone wastes, especially comprising silicone elastomers and/or silicone rubbers, by acid-catalysed depolymerization thereof in a solvent-free reaction system comprising at least one compound providing end groups $M^R$,
and at least one compound providing D units,
and at least one Brønsted acid.

In the context of the present invention a compound providing end groups $M^R$ is to be understood as meaning in particular an organosilicon compound comprising at least 1 silicon atom which upon application of the process according to the invention contributes one or two methyl groups and/or one or two chlorine atoms and/or one or two hydrogen atoms and/or one or two vinyl groups and/or one or two alkoxy groups, preferably one or two ethoxy groups and/or one or two methoxy groups, to the terminal saturation, i.e. to the bonding saturation of the α and ω position of the desired endcapped liquid siloxane. In the context of the present invention "endcapped" is accordingly to be understood as meaning that the liquid siloxanes resulting according to the invention having chain lengths >3 silicon atoms are in their α,ω-positions substituted with methyl groups and/or chlorine atoms and/or hydrogen atoms and/or vinyl groups and/or alkoxy groups, especially ethoxy groups and/or methoxy groups. All chemical compounds providing acetoxy groups in particular are excluded according to the invention.

Liquid siloxanes are those that are liquid under standard conditions (T=25° C., p=1013 hPa). In a preferred embodiment of the invention the compound providing end groups $M^R$ comprises in particular hexamethyldisiloxane, polydimethylsiloxanes, poly(methylhydrogen)siloxane, poly(methylhydrogen)polydimethylsiloxane copolymer, trimethylchlorosilane, dimethyldichlorosilane, dichlorotetramethyldisiloxane, α,ω-dichloropolydimethylsiloxane, monoalkoxytrimethylsilane, in particular monomethoxytrimethylsilane or monoethoxytrimethylsilane, dialkoxydimethylsilane, in particular dimethoxydimethylsilane or diethoxydimethylsilane, α,ω-dialkoxypolydimethylsiloxanes, in particular α,ω-dimethoxypolydimethylsiloxanes or α,ω-diethoxypolydimethylsiloxanes, tetramethyldisiloxane, α,ω-dihydrogenpolydimethylsiloxanes, divinyltetramethyldisiloxane or α,ω-divinylpolydimethylsiloxanes or else mixtures of the abovementioned compounds; in particular, the compound providing end groups $M^R$ is selected from one or more of the abovementioned compounds.

In a preferred embodiment of the invention the compound providing D units comprises especially at least one cyclosiloxane selected from hexamethylcyclotrisiloxane, octamethylcyclotetrasiloxane, decamethylcyclopentasiloxane and/or dodecamethylcyclohexasiloxane and/or a siloxane containing D groups recited among the compounds providing end groups $M^R$; in particular, the compound providing D units is selected from one or more of the abovementioned compounds.

The acid-catalysed solvent-free depolymerization according to the invention is preferably carried out in the temperature range of 30° C. to 150° C., preferably in the temperature range of 45° C. to 130° C. and, in the case of decomposition-labile α,ω-dihydrogenpolydimethylsiloxanes, particularly preferably in the temperature range of 35° C. to 80° C.

Surprisingly to a person skilled in the art the inventive depolymerization of silicone wastes to endcapped siloxanes proceeds quite quickly under mild temperature conditions, thus surprisingly providing synthetic access in only one step even to the sensitive α,ω-dihydrogenpolydimethylsiloxanes without SiH loss (see inventive example 3).

The process according to the invention is preferably performed over a period of 1 hour to 10 hours, preferably of 2 hours to 8 hours, particularly preferably of 3 hours to 6 hours.

The Brønsted acid employed according to the invention is preferably selected from protic acids having a $pK_A$ of less than −1.30, such as preferably nitric acid, methanesulfonic acid and/or p-toluenesulfonic acid, preferably protic acids having a $pK_A$ of less than −2.90, such as preferably concentrated sulfuric acid, particularly preferably protic acids having a $pK_A$ of less than −4.90, such as preferably the perfluoroalkanesulfonic acids such as heptafluoropropanesulfonic acid, pentafluoroethanesulfonic acid, trifluoromethanesulfonic acid, perchloric acid and/or chlorosulfonic acid, wherein especially perfluoroalkanesulfonic acids are preferred and wherein trifluoromethanesulfonic acid is very particularly preferred, and/or preferably sulfonic acid-acidified or perfluoroalkylsulfonic acid-acidified ion exchange resins.

The Brønsted acid employed according to the invention is employed preferably in amounts of 0.05 to 3 percent by weight, preferably of 0.1 to 1.0 percent by weight, particularly preferably of 0.2 to 0.8 percent by weight, based on the total silicone content of the reaction system.

The process according to the invention may be performed both on fluidly viscous and on partially or completely cured silicone wastes.

A preferred embodiment of the invention, in the case especially of completely cured silicone wastes, provides for comminution thereof into a chunk material which at the end of comminution preferably has a diameter of 1 to 10 mm, in particular of 3 to 6 mm.

To achieve this target geometry the silicone waste may advantageously be first subjected to cold embrittlement, i.e. be markedly reduced in elasticity, by contacting with liquid nitrogen or else dry ice pellets for example and then suitably comminuted.

Preferably according to the invention the optional comminution of the cold-embrittled material may be effected for example using a crusher, a shredder, a mill, a hammer mill, using rollers or a kneader or else using cutting machines.

As is evident to those skilled in the art the process according to the invention is preferably undertaken in reactors having appropriate stirring apparatuses and/or shearing internals to achieve effective commixing of the reaction system in the acid-catalyst solvent-free depolymerization.

In a preferred embodiment of the invention the process according to the invention relates to a process for recycling/upcycling of silicone wastes, in particular of silicone adhesives and/or sealants, silicone rubber wastes. In a further preferred embodiment of the invention, the silicones to be utilized have molar masses of >236 g/mol.

In a particularly preferred embodiment of the invention the process according to the invention has the feature that the silicone wastes comprise silicone adhesives and/or silicone sealants, preferably silicone adhesive and/or silicone sealant cartridges, in particular silicone adhesive and/or silicone sealant residues in and/or on polyolefin containers, preferably PE containers, preferably comprising HDPE and/or LDPE. Customary silicone adhesive and/or silicone sealant cartridges comprise a silicone adhesive compound and/or silicone sealant compound in a polyolefin container, preferably polyethylene container (PE container), which allows expulsion of the silicone adhesive compound and/or silicone sealant compound by application of pressure, wherein the container casing is typically made of HDPE (high-density polyethylene) and the semi-transparent container components (plunger and applicator tip) are typically made of LDPE (low-density polyethylene). HDPE and LDPE are known to those skilled in the art. HDPE has a high density of between 0.94 g/cm$^3$ and 0.97 g/cm$^3$; LDPE by contrast has a lower density between 0.915 g/cm$^3$ and 0.935 g/cm$^3$.

As a further considerable advantage the process according to the invention thus additionally allows substantially single stream recycling of polyolefin, preferably polyethylene, in particular high-density polyethylene (HDPE), originating from preferably used silicone adhesive and/or silicone sealant cartridges. Said process more generally allows utilization of silicone-contaminated polyolefin wastes, preferably PE wastes, to provide acidic alkoxysiloxanes, hydrogensiloxanes, chlorosiloxanes, polydimethylsiloxanes and/or vinylsiloxanes having chain lengths of greater than 3 silicon atoms in the course of substantially single stream recovery of polyolefin, preferably polyethylene.

The significance and scale of the specific problem of silicone contamination in HDPE waste is apartment inter alia from a study by Ketenakkoord Kunststofkringloop and Afvalfonds Verpakkingen "Kitkokers in een circulaire economie", authors I. Gort and S. Haffmans, dated 1 May 2017 (available from Kennisinstituut Duurzaam Verpakken, Zuid Hollandlaan 7, 2596 AL Den Haag, the Netherlands, or from their website at https://kidv.nl/ and specifically https://kidv.nl/media/rapportages/kitkokers_in_een_circulaire_economy.pdf?1.1.2-rc.1), which illustrates the dramatic effects minor silicone contamination can have on the reusability of recycled pellet material obtained from waste. For instance, silicone components themselves migrate through the fine 150 µm melt grids of a pelletizing extruder, thereby ending up in the recycled pellet material and ultimately causing production defects at the plastics processing plant producing plastic tubing by extrusion blow moulding, for example. It is said that even a single particle of silicone is sufficient to cause surface defects and cavities in the polymer, potentially rendering unusable a whole batch that took hours to produce. The contaminated HDPE is a low-value material and can accordingly be used further only for noncritical purposes.

Such silicone-contaminated material from recycled cartridges is currently acceptable only for processing into crude items such as insulating walls, scaffolding planks, boundary posts, railway sleepers and picnic tables, in which the presence of silicone particles is less noticeable, since a smooth surface is not necessarily expected. However, the study does not hold out hope for physical recycling of the silicone component.

The silicone residues, in particular residues from used and thus partially emptied silicone sealant cartridges, adhere firmly and—depending on the stage of the curing process—usually stubbornly to the surrounding cartridge wall, and also to the applicator plunger and applicator tip of the cartridge, and cannot be detached easily, and certainly not entirely, from the HDPE that is predominantly used. The study states that all parts of a sealant cartridge are essentially made of polyethylene, the jacket being produced from HDPE and the semi-transparent parts (plunger and applicator tip) often from LDPE (low-density polyethylene).

According to the invention it has now been found that, surprisingly, the cured silicone residues remaining in the cartridge can be completely detached from polyolefin, preferably HDPE and LDPE, when the preferably comminuted sealant cartridge that has been cut into small pieces, for example, is subjected to digestion in an acidic reaction medium comprising at least one compound providing end groups $M^R$ and at least one compound providing D units and at least one Brønsted acid.

This causes the silicone residues to be completely detached from the carrier material which, through filtration and optionally further washing step(s) and drying, is then obtained as virtually single stream, silicone-free polyolefin, preferably HDPE or LDPE.

The thus detached silicone is preferably transformed into an acidicalkoxysiloxane or hydrogensiloxane, chlorosiloxane, polydimethylsiloxane or vinylsiloxane having a chain length of greater than 3 silicon atoms.

The route found according to the invention thus additionally opens up the technical possibility of recovering not only single stream polyolefin, preferably HDPE, but also—in the context of upcycling from low-value, problematic silicone wastes—high-value reactive siloxanes that can be processed into valuable surface-active additives.

End-of-life silicone sealant cartridges with adhering silicone can advantageously first be cold-embrittled through contact with for example liquid nitrogen or even dry ice pellets, thereby undergoing a significant reduction in elasticity, and can then be appropriately comminuted. Cold-embrittled silicone sealant cartridges can be comminuted for example with the aid of a crusher, a shredder, a mill, a hammer mill, with the aid of rollers or a kneading device or else with the aid of cutting machines. After comminution, the silicone-contaminated cartridge material of small particle size preferably has edge lengths of 1 to 10 mm, in particular of 3 to 6 mm. It is preferable according to the invention that the comminuted material can immediately be subjected to an acid-catalysed depolymerization in a system comprising at least one compound providing end groups $M^R$ and at least one compound providing D units and at least one Brønsted acid.

However, less preferably it is also possible, for example according to the teaching of WO 2008/097306 A1, to initially subject the silicone-contaminated cartridge material of small particle size to a preliminary separation by introducing said material to a liquid having a density between that of silicone and that of the cartridge material and thus effecting a density separation of cartridge material and silicone fractions (corresponding to the formation of density-separated layers).

The limitations of this type of preliminary separation are demonstrated inter alia in the study by Ketenakkoord Kunststofkringloop en Afvalfonds Verpakkingen (see above, pages 22 and 34). For instance, the separation sharpness in the density separation is reduced for example by occluded air inclusions in the silicone that cause buoyancy, thus resulting in greater or smaller proportions of silicone again ending up in the plastic layer.

The acid-catalysed depolymerization is preferably performed in a reactor of at least one litre in volume. Due to the aggressive nature of the reaction medium according to the invention the reactor material is by preference selected from glass or ceramic, preferably from metal, by preference highly alloyed stainless steels, particularly preferably from Hastelloy.

The reactor itself should—if not electrically heated—preferably be equipped with a heating jacket that permits coupling to a suitable heat transfer medium circuit (for example based on heat-transfer oil or superheated steam).

For the purposes of intensive contacting and easier detachment of the silicone from HDPE/LDPE the silicone-contaminated cartridge material of small particle size is kept in motion in the acidic reaction medium through the use of an effective stirring apparatus Should the silicone sealant contain filler materials these are likewise separated from the HDPE/LDPE through the acid-catalysed depolymerizing detachment and dissolution of the silicone. After the digestion according to the invention the HDPE/LDPE particles of small particle size are removed by filtration using a coarse sieve from the liquid, filler-interspersed endcapped siloxane, and the latter can then be separated from the solid, finely divided filler for example by settling.

In accordance with the invention and without narrowing the presented teaching, as advantageous embodiments it is of course also possible to find further solutions for the basic process operations discussed here, such as filtrative removal or centrifugal separation of the filler from the endcapped, liquid siloxane.

Traces of silicone can be eliminated from the HDPE/LDPE particles of small particle size through suitable washing, for example by thorough contacting with solvents, separation thereof and subsequent drying of the single stream polymer(s).

The term "end-of-life silicones/silicone wastes" encompasses in the context of the teaching of the invention all silicone-based or silicone-containing products and also products with adhering silicone or contaminated with silicone that are close to attaining and/or have already completely attained their respective technical service life or shelf life or else would be intended for disposal for any other reason. The shelf life or service life here describes the time that a material or an article can be used without the replacement of core components or complete failure. The scope of the teaching also includes silicone adhesives and/or silicone sealants, for example in cartridges, that are close to reaching and/or have surpassed the end of their shelf life or their expiry date (assessed according to the degree of hardening to be expected and/or which has already occurred), and also, for example, sprue and/or stamping waste of varying age from silicone rubber production or similarly also discarded electronic scrap containing silicone-sealed components/component groups. The term "end-of-life silicones/silicone wastes" in the context of the teaching of the invention further encompasses all silicone wastes, including production wastes. It encompasses in particular all silicones or silicone-containing components or components with adhering silicone or contaminated with silicone that would otherwise be intended for disposal in the usual manner and are accordingly regarded as waste. It thus also encompasses for example silicone adhesive and/or sealant cartridges, in particular used silicone adhesive and/or sealant cartridges, intended for disposal which still have silicone residues adhering or present in and on them. As indicated hereinabove the terms "silicone wastes" and "end-of-life silicones" are to be understood as being synonymous in the context of the present invention.

The term "acidic depolymerization" in the context of the present invention encompasses the process of transforming the end-of-life silicones in the reaction system according to the invention into acidic alkoxysiloxanes, hydrogensiloxanes, chlorosiloxanes, polydimethylsiloxanes and/or vinylsiloxanes having chain lengths of greater than 3 silicon atoms preferably by supplying thermal energy, preferably comprising a corresponding heat treatment of the silicone wastes at temperatures of advantageously 30° C. to 150° C., preferably in the temperature range of 45° C. to 130° C., and in the case of decomposition-labile α,ω-dihydrogenpolydimethylsiloxanes particularly preferably in the temperature range of 35° C. to 80° C.

Some prior art documents are concerned with the desiliconization of components occurring in the area of electronic components or discarded electronic scrap (JP H04 318075 A and U.S. Pat. No. 6,652,665 B1) or else in polyamide or polyester synthetic fibre fabrics specifically for airbags (US 2010/0012623 A1 and EP 0950684 A2).

For instance, JP H04 318075 A teaches the detachment at room temperature of hardened silicone resins from hard, non-sensitive substrates, for example glass-epoxy supports and ceramic supports, with the aid of a mixture consisting of aliphatic hydrocarbons, chlorinated aliphatic hydrocarbons and monocyclic aromatics, acetone, methyl ethyl ketone, cyclohexanone, acetic acid/n-butyl acetate or a mixture consisting of the recited solvents or tetrahydrofuran with dodecylbenzenesulfonic acid, the solvent fraction being within a range from 40 to 90 percent by weight and the dodecylbenzenesulfonic acid fraction being within a range from 60 to 10 percent by weight.

The teaching of U.S. Pat. No. 6,652,665 B1 is aimed also at the removal of silicone deposits from electronic components and uses as a wash solution for this purpose quaternary ammonium fluorides in a hydroxyl-free aprotic solvent.

Mignani in US 2010/0012623 A1 focuses on a delamination process for articles such as airbags, in which the silicone-coated substrate is separated from the silicone by dissolution or suspension in an aqueous solution of an alkali metal hydroxide or alkaline earth metal hydroxide in the presence of a phase transfer catalyst, optionally with additional heat treatment.

Likewise focussing on the utilization of the polyamide material of value specifically present in airbag wastes, EP 0950684 A2 is concerned with the processing of polyamide materials containing silicone resins through treatment of said materials with alkali metal hydroxide while heating, removal of the solid material from the solution, and neutralization of the solid material with phosphoric acid.

However, none of the recited desiliconization processes is concerned with the value-creating transformation of the silicone component to be removed and, more particularly, with the provision of high-value endcapped siloxanes which are for example suitable directly for production of surface-active substances.

The process claimed according to the invention takes account of this and allows not only the recovery of this silicone-bearing material regarded as a material of value but also the upcycling of the detached silicone preferably to afford a respectively Brønsted-acidic alkoxysiloxane, hydrogensiloxane, chlorosiloxane, polydimethylsiloxane or vinylsiloxane having chain lengths of greater than 3 silicon atoms which may be readily employed as reactive siloxanes for a multiplicity of subsequent reactions.

The term "upcycling" thus denotes for the purposes of the present invention the transformation of silicone wastes into higher-value products, in other words a physical upgrade; based on the definition in I. Vollmer et al., Angew. Chem. Int. Ed. 2020, 59, 15402-15423, the term "upcycling" thus preferably denotes for the purposes of the present invention the transformation of silicone waste into chemicals having higher market value than monomers or pyrolysis oil.

Since the digestion according to the invention takes place under moderate reaction conditions, any HDPE/LDPE that is for example recycled in tandem does not suffer any loss of quality.

According to the invention the acid-catalysed depolymerization of the silicone wastes is preferably carried out in the temperature range of 30° C. to 150° C., preferably in the temperature range of 45° C. to 130° C. and, in the case of decomposition-labile α,ω-dihydrogenpolydimethylsiloxanes, particularly preferably in the temperature range of 35° C. to 80° C.

The digestion according to the invention may advantageously be undertaken at standard pressure (1013 hPa) or in pressure-resistant apparatuses under positive pressure. The digestion according to the invention is preferably carried out at standard pressure.

It is preferable according to the invention when in a preferred embodiment of the invention the Brønsted acid is employed in amounts of advantageously 0.1 to 1.5 percent by mass, preferably in amounts of 0.15 to 1.0 percent by mass, particularly preferably in amounts of 0.2 to 0.8 percent by mass, based on the total silicone content of the reaction system.

"Reaction system" is to be understood as meaning the overall mixture subjected to the depolymerization according to the invention, i.e. at least comprising the silicone wastes to be utilized, in particular comprising silicone elastomers and/or silicone rubbers, and at least one compound providing end groups $M^R$ and at least one compound providing D units and at least one Brønsted acid.

The process according to the invention is performed in the absence of solvents. This is because the use of solvents can at the very least result in a reduction in the space-time yield of the endcapped, liquid siloxanes such as alkoxysiloxanes, hydrogensiloxanes, chlorosiloxanes, polydimethylsiloxanes and/or vinylsiloxanes and moreover necessitate the later separation of the solvent. Furthermore, and depending on the respective chemical nature of the specific solvent, this could result in partial or complete inhibition of the depolymerization process according to the invention and/or to undesired side reactions. In the context of the present invention "solvent-free reaction system" is to be understood as meaning that the proportion of solvent based on the reaction system is less than 2 percent by weight, preferably less than 0.5 percent by weight, particularly preferably less than 0.1 percent by weight, by preference less than 0.01 percent by weight.

According to the invention "solvents" are to be understood as meaning organic solvents such as alkanes, cycloalkanes, aromatics, alkylaromatics, ethers, esters, ketones, carboxylic acids, carboxylic anhydrides, carbonate esters, alcohols and/or water.

According to the invention the term "solvent" does not include the compound providing end groups $M^R$ nor the compound providing D units nor the Brønsted acid to be employed according to the invention.

Noninventive example 7 illustrates the abovementioned aspect of inhibition, i.e. no acid-catalysed depolymerization of a cured silicone sealant in a solvent-containing reaction system occurs with the commonly used solvent isopropanol. The cured silicone sealant employed is re-isolated in practically unchanged form.

Having regard to the Brønsted acid to be employed according to the invention it corresponds to a particularly preferred embodiment of the invention when Brønsted acids employed in the process according to the invention are protic acids having a pKa of less than −1.30, such as preferably nitric acid, methanesulfonic acid and/or p-toluenesulfonic acid, preferably protic acids having a pKa of less than −2.90, such as preferably concentrated sulfuric acid, particularly preferably protic acids having a pKa of less than −4.90, such as preferably perfluoroalkanesulfonic acids such as heptafluoropropanesulfonic acid, pentafluoroethanesulfonic acid, trifluoromethanesulfonic acid, perchloric acid and/or chlorosulfonic acid, wherein especially perfluoroalkanesulfonic acids are preferred and trifluoromethanesulfonic acid is very particularly preferred and/or wherein sulfonic acid- or perfluoroalkylsulfonic acid-acidified ion-exchange resins may preferably be employed.

In the context of the present invention silicone is to be understood as meaning the total mass of silicone in the reaction system.

The Brønsted acid-acidified chlorosiloxane producible according to the invention, even on account of its intrinsically acidic character, does not require any neutralization for further processing in particular to SiOC-bonded downstream products, for example SiOC-bonded polyether siloxanes. The Brønsted acid present in the chlorosiloxane from the process according to the invention is generally not disruptive in further processing.

By contrast, if desired for further processing, the Brønsted acid-acidified alkoxysiloxanes, hydrogensiloxanes, polydimethylsiloxanes or vinylsiloxanes producible according to the invention may optionally be neutralized by introduction of a solid, liquid or gaseous base.

Preferably in accordance with the invention ammonia may be introduced into the Brønsted acid-acidified endcapped siloxane optionally to be neutralized.

Solid and/or liquid bases optionally employable according to the invention preferably include a hydrogencarbonate and/or carbonate of an alkali metal or alkaline earth metal, optionally also in the form of a hydrate and/or an organic amine base in the form of a primary or secondary amine or an acetate salt, wherein the optional treatment of the siloxane with a solid and/or liquid and/or gaseous base is preferably performed in the temperature range of 0° C. to 140° C., preferably of 20° C. to 110° C. and very particularly preferably between 30° C. and 80° C.

The amount of the base to be optionally introduced into the siloxane is preferably measured such that it is at least equal to the acid equivalent present in the siloxane, preferably twice to ten times the amount.

Any desired separation of the salt precipitated in the optional neutralization from the endcapped siloxane may preferably be effected by filtration. When filled silicone wastes, in particular comprising filled silicone elastomers and/or filled silicone rubbers, are converted into endcapped siloxanes by the acid-catalysed depolymerization according to the invention the thus-liberated filler proportion may preferably be separated together with the precipitated salt.

In a further embodiment of the process that is preferred according to the invention the Brønsted acid-acidified endcapped siloxane is initially separated from the liberated filler content by filtration and the thus obtained filtrate is subsequently neutralized by introduction of a solid, liquid or gaseous base.

It will be clear to those skilled in the art that, before processing unknown silicone wastes, it is advisable to take a representative sample and then to carry out a test digestion on a laboratory and/or pilot-plant scale in order to determine how high the actual silicone content is and also what proportion of silicone-free components is to be expected. These include inter alia binders, plastics and, for example in the case of electronic scrap, metals, ceramics, etc.

According to the invention, the reaction is preferably carried out in a reactor by preference having a volume of at least 1 litre, but preferably at least 5 litres, in particular at least 10 litres, and preferably not more than 500 000 litres.

The term "reactor" is well known to those skilled in the art and therefore needs no separate explanation. A reactor usually, and thus also preferably for the purposes of the present invention, refers to a defined space, for example a stirred container (e.g. a stirred-tank reactor) or a pipe (e.g. flow tube as a flow reactor), in which chemical transformations can be carried out in a selective manner. As is known to those skilled in the art, these may be open or closed containers in which the reactants are converted into the desired products or intermediates. The volume of reactors is stated by the manufacturer or may be determined by volumetric measurement. The reactor material may preferably be selected from materials suitable for this purpose, such as advantageously glass or ceramic, preferably from metal, in particular highly alloyed stainless steels and particular preferably from Hastelloy. All this is known to those skilled in the art. Suitable reactors are preferably equipped with apparatuses that allow mixing of the reaction mass. Suitable stirring means are known to those skilled in the art and comprise for example dissolvers, propeller stirrers, anchor stirrers, bar stirrers, magnetic stirrers, cup stirrers, jet mixers or inclined blade stirrers. Heating or cooling of the reaction mass may be effected using any known means such as for example a double jacket, full pipe coils or half pipe coils. As regards modes of operation, a distinction can essentially be made between a continuous and a discontinuous operating mode. For large product quantities continuous processes may be employed while smaller product quantities are preferably produced in batchwise operation.

All this is familiar to those skilled in the art. Reactors, such as stirred-tank reactors in particular are commercially available in a variety of forms, for example from Behälter K G Bremen GmbH & Co, Theodor-Barth-Str. 25, 28307 Bremen, Germany, or for example from Büchi A G, Gschwaderstrasse 12, 8610 Uster, Switzerland. Supplementary reference is also made to the book "Chemiereaktoren: Grundlagen, Auslegung und Simulation (Deutsch), 19 Apr. 2017, Jens Hagen"; and to the book "Handbuch Chemische Reaktoren, Grundlagen und Anwendungen der Chemischen Reaktionstechnik, edited by Reschetilowski, Wladimir, Springer, Berlin; 1st Edition 2020"; as well as to the book, Lothar Martens: Chemische Verfahrenstechnik: Berechnung, Auslegung und Betrieb chemischer Reaktoren, Oldenbourg, Munich 2007.

The present invention further provides endcapped, acidic liquid siloxanes having chain lengths of greater than 3 silicon atoms, preferably alkoxysiloxanes, hydrogensiloxanes, chlorosiloxanes, polydimethylsiloxanes and/or vinylsiloxanes produced by a process according to the invention as described hereinabove.

The present invention further provides for the use of acidic siloxanes having chain lengths of greater than 3 silicon atoms, preferably alkoxysiloxanes, hydrogensiloxanes or chlorosiloxanes, produced from silicone wastes, in particular as specified here in accordance with the invention, for production of polyether siloxanes, in particular for production of polyurethane foam stabilizers, defoamers, coatings additives, levelling and dispersing additives and/or demulsifiers. Such polyether siloxanes are obtainable for example by reaction of hydrogensiloxanes with unsaturated polyetherols (for example allyl polyethers) in the presence of transition metal catalysts (hydrosilylation) or else of hydrogensiloxanes with polyetherols under catalytically induced hydrogen liberation (dehydrogenative SiOC linkage).

EXAMPLES

The examples that follow serve solely to elucidate this invention to those skilled in the art and do not constitute any restriction at all of the claimed process. The determination of water contents according to the invention is performed in principle by the Karl Fischer method based on DIN 51777, DGF E-III 10 and DGF C-III 13a. $^{29}$Si-NMR spectroscopy was used for reaction monitoring in all examples.

In the context of the present invention the $^{29}$Si NMR samples are analysed at a measurement frequency of 79.49 MHz in a Bruker Avance III spectrometer equipped with a 287430 probe head with slit width of 10 mm, at 22° C. in CDCl$_3$ solution, and against a tetramethylsilane (TMS) external standard [δ($^{29}$Si)=0.0 ppm].

The gas chromatograms are recorded on an Agilent Technologies GC 7890B GC instrument fitted with an HP-1 column having dimensions of 30 m×0.32 mm ID×0.25 µm dF (Agilent Technologies No. 19091Z-413E) using hydrogen as a carrier gas and employing the following parameters:
Detector: FID; 310° C.
Injector: Split; 290° C.
Mode: constant flow, 2 ml/min Temperature program: 60° C. at 8° C./min-150° C. at 40° C./min-300° C. 10 min.

Example 1 (Inventive)

Production of a Polydimethylsiloxane from Silicone Caulk 30 g of a silicone caulk bead (MEM® Universal-Silikon (white)) discharged onto a polyethylene film and cured, in the form of irregular chunks of 3-4 mm in size, was initially charged with slow stirring into a 500 mL four-necked round bottom flask fitted with a KPG stirrer and a reflux condenser together with 70 g of decamethylcyclopentasiloxane and 12.5 g of hexamethyldisiloxane and then admixed with 0.69 g of concentrated sulfuric acid (0.6 percent by weight based on the total batch) and heated to 120° C. for 4 hours with further stirring.

Over the course of the reaction the chunk-like constituents of the reaction matrix are gradually liquefied to obtain a slightly viscous liquid comprising only fine solids particles. After filtration through a filter press (K 300 filter disk) a $^{29}$Si-NMR spectrum of the clear filtrate verifies that a trimethylsilyl-endcapped polydimethylsiloxane has been formed.

Example 2 (Inventive)

Production of an α-Monochloropolydimethylsiloxane 30 g of a silicone caulk bead (Soudal Sanitär Dusche & Bad, transparent) discharged onto a polyethylene film and cured, in the form of irregular chunks of 3-4 mm in size, was initially charged with slow stirring into a 500 mL four-necked round bottom flask fitted with a KPG stirrer and a reflux condenser together with 60 g of decamethylcyclopentasiloxane and 10.0 g of trimethylchlorosilane and then admixed with 0.20 g of concentrated trifluoromethanesulfonic acid (0.2 percent by weight based on the total batch) and heated to 50° C. for 4 hours with further stirring.

Over the course of the reaction the chunk-like constituents of the reaction matrix are gradually liquefied to obtain a slightly viscous liquid comprising only fine solids particles. After filtration through a filter press (K 300 filter disk) a $^{29}$Si-NMR spectrum of the clear filtrate verifies that a mixed chlorotrimethylsilyl-endcapped polydimethylsiloxane has been formed.

Example 3 (Inventive)

Production of an α,ω-Dihydrogenpolydimethylsiloxane 30 g of a silicone caulk bead (Soudal Sanitär Dusche & Bad, transparent) discharged onto a polyethylene film and cured, in the form of irregular chunks of 3-4 mm in size, was initially charged with slow stirring into a 500 mL four-necked round bottom flask fitted with a KPG stirrer and a reflux cooler together with 40.0 g of decamethylcyclopentasiloxane and 30.0 g of an α,ω-dihydrogenpolydimethylsiloxane (SiH value: 3.06 mol SiH/kg determined by gas volumetry (decomposition of a weighed-in aliquot with sodium butoxide solution using a gas burette) corresponding to an average chain length N=9.3) and then admixed with 0.20 g of concentrated trifluoromethanesulfonic acid (0.2 percent by weight based on the total batch) and heated to 50° C. for 2 hours with further stirring.

Over the course of the reaction the chunk-like constituents of the reaction matrix are gradually liquefied to obtain an H$_2$S-smelling liquid comprising only fine solids particles which is freed of the solids content using a filter press (K 300 filter disc). The obtained clear filtrate is identified by the corresponding $^{29}$Si-NMR spectrum as having the structure of an α,ω-dihydrogenpolydimethylsiloxane having an average chain length N of about 28.7. An accompanying gas volumetric determination on a weighed-in filtrate sample verifies that all SiH employed is retained.

Example 4 (Inventive)

Production of an α,ω-Dichloropolydimethylsiloxane 30 g of a silicone caulk bead (Soudal Sanitär Dusche & Bad, transparent) discharged onto a polyethylene film and cured, in the form of irregular chunks of 3-4 mm in size, was initially charged with slow stirring into a 500 mL four-necked round bottom flask fitted with a KPG stirrer and a reflux condenser together with 40.0 g of decamethylcyclopentasiloxane and 30.0 g of an α,ω-dichloropolydimethylsiloxane (acid value: 4.32 mol/kg determined by acidimetric titration of an aliquot decomposed in H$_2$O/acetone, corresponding to an average chain length N=5.5) and then admixed with 0.60 g of concentrated sulfuric acid (0.6 percent by weight based on the total batch) and heated to 120° C. for 4 hours with further stirring.

Over the course of the reaction the chunk-like constituents of the reaction matrix are gradually liquefied to obtain a liquid comprising only fine solids particles which after filtration through a K 300 filter disc affords a clear filtrate which is identified by the corresponding $^{29}$Si-NMR spectrum as having the structure of an α,ω-dichloropolydimethylsiloxane having an average chain length N of about 38.3.

Example 5 (Inventive)

Production of an α,ω-Diethoxypolydimethylsiloxane 30 g of a silicone caulk bead (Soudal Sanitär Dusche & Bad, transparent) discharged onto a polyethylene film and cured, in the form of irregular chunks of 3-4 mm in size, was initially charged with slow stirring into a 500 mL four-necked round bottom flask fitted with a KPG stirrer and a reflux condenser together with 70.0 g of decamethylcyclopentasiloxane and 12.5 g of diethoxydimethylsilane and then admixed with 0.69 g of concentrated sulfuric acid (0.6 percent by weight based on the total batch) and heated to 120° C. for 4 hours with further stirring.

Over the course of the reaction the chunk-like constituents of the reaction matrix are gradually liquefied to obtain a liquid comprising fine solids particles which after filtration through a K 300 filter disc affords a clear filtrate which is identified by the corresponding $^{29}$Si-NMR spectrum as having the structure of an α,ω-diethoxypolydimethylsiloxane having an average chain length N of about 20.7.

Example 6 (Inventive)

Production of an α,ω-Diethoxypolydimethylsiloxane 30 g of a silicone caulk bead (MEM® Universal-Silikon (white)) discharged onto a polyethylene film and cured, in the form of irregular chunks of 3-4 mm in size, was initially charged with slow stirring into a 500 mL four-necked round bottom flask fitted with a KPG stirrer and a reflux condenser together with 70.0 g of decamethylcyclopentasiloxane and 12.5 g of diethoxydimethylsilane and then admixed with 0.69 g of concentrated sulfuric acid (0.6 percent by weight based on the total batch) and heated to 120° C. for 4 hours with further stirring.

Over the course of the reaction the chunk-like constituents of the reaction matrix are gradually liquefied to obtain a liquid comprising only fine solids particles. Filtration through a K 300 filter disc in a filter press affords a clear filtrate which is identified by the corresponding $^{29}$Si-NMR spectrum as having the structure of an α,ω-diethoxypolydimethylsiloxane having an average chain length N of about 22.8. A very clear signal is also apparent at a chemical shift about 67 ppm indicating the presence of T groups in an amount of about 0.1 mole percent.

Example 7 (Non-Inventive)

Attempted Production of an α,ω-Dihydrogenpolydimethylsiloxane 30 g of a silicone caulk bead (Hellweg Basic Silikon, transparent) discharged onto a polyethylene film and cured, in the form of irregular chunks of 3-4 mm in size, was initially charged with slow stirring into a 500 mL four-necked round bottom flask fitted with a KPG stirrer and a reflux condenser together with 70.0 g of isopropanol and 12.5 g of an α,ω-dihydrogenpolydimethylsiloxane (SiH value: 3.06 mol SiH/kg determined by gas volumetry (decomposition of a weighed-in aliquot with sodium butoxide solution using a gas burette) corresponding to an average chain length N=9.3) and then admixed with 0.20 g of concentrated trifluoromethanesulfonic acid (0.2 percent by weight based on the total batch) and initially heated at 22° C. for 2 hours initially and then heated to 50° C. for 4 hours with further stirring.

The chunk-like constituents of the flask contents do not undergo any visible change during this treatment. Cooling the overall mass results in isolation of flask contents where a transparent, colorless liquid phase covers the visually unchanged silicone chunks.

Example 8 (Inventive)

Production of a Polydimethylsiloxane from Silicone Caulk 30 g of a silicone caulk bead (Hellweg Basic Silikon, transparent) discharged onto a polyethylene film and cured, in the form of irregular chunks of 3-4 mm in size, was initially charged with slow stirring into a 500 mL four-necked round bottom flask fitted with a KPG stirrer and a reflux condenser together with 70 g of decamethylcyclopentasiloxane and 12.5 g of hexamethyldisiloxane and then admixed with 0.69 g of methanesulfonic acid (0.6 percent by weight based on the total batch) and heated to 120° C. for 4 hours with further stirring.

Over the course of the reaction the chunk-like constituents of the reaction matrix are gradually liquefied to obtain a slightly viscous liquid comprising only fine solids particles. After filtration through a filter press (K 300 filter disk) a $^{29}$Si-NMR spectrum of the clear filtrate verifies that a trimethylsilyl-endcapped polydimethylsiloxane has been formed.

The invention claimed is:

1. A process for producing endcapped, liquid siloxanes having chain lengths of greater than 3 silicon atoms from a silicone by acid-catalysed depolymerization thereof, comprising mixing, in a solvent free reaction system:
   (i) at least one compound providing end groups $M^R$;
   (ii) at least one compound providing D units; and
   (iii) at least one Brønsted acid; and
   (iv) the silicone;
   wherein the compound providing end groups $M^R$ is selected from the group consisting of: hexamethyldisiloxane, polydimethylsiloxanes, poly(methylhydrogen)

siloxane, poly(methylhydrogen)polydimethylsiloxane copolymer, trimethylchlorosilane, dimethyldichlorosilane, dichlorotetramethyldisiloxane, α,ω-dichloropolydimethylsiloxane, monoalkoxytrimethylsilane, dialkoxydimethylsilane, α,ω-dialkoxypolydimethylsiloxanes, tetramethyldisiloxane, α,ω-dihydrogenpolydimethylsiloxanes, divinyltetramethyldisiloxane, α,ω-divinylpolydimethylsiloxanes and mixtures thereof; and wherein the compound providing D units is selected from the group consisting of: hexamethyldisiloxane, polydimethylsiloxanes, poly(methylhydrogen)siloxane, poly(methylhydrogen)polydimethylsiloxane copolymer, trimethylchlorosilane, dimethyldichlorosilane, dichlorotetramethyldisiloxane, α,ω-dichloropolydimethylsiloxane, monoalkoxytrimethylsilane, dialkoxydimethylsilane, α,ω-dialkoxypolydimethylsiloxanes, tetramethyldisiloxane, α,ω-dihydrogenpolydimethylsiloxanes, divinyltetramethyldisiloxane, α,ω-divinylpolydimethylsiloxanes, hexamethylcyclotrisiloxane; octamethylcyclotetrasiloxane; decamethylcyclopentasiloxane; and dodecamethylcyclohexasiloxane and mixtures thereof.

2. The process of claim 1, wherein the silicone comprises silicone elastomers and/or silicone rubbers.

3. The process of claim 1, wherein the compound providing D units is selected from the group consisting of: hexamethyldisiloxane, polydimethylsiloxanes, poly(methylhydrogen)siloxane, poly(methylhydrogen)polydimethylsiloxane copolymer, trimethylchlorosilane, dimethyldichlorosilane, dichlorotetramethyldisiloxane, α,ω-dichloropolydimethylsiloxane, monoalkoxytrimethylsilane, dialkoxydimethylsilane, α,ω-dialkoxypolydimethylsiloxanes, tetramethyldisiloxane, α,ω-dihydrogenpolydimethylsiloxanes, divinyltetramethyldisiloxane, α,ω-divinylpolydimethylsiloxanes and mixtures thereof.

4. The process of claim 1, wherein the compound providing end groups $M^R$ is selected from the group consisting of: monomethoxytrimethylsilane, monoethoxytrimethylsilane, dimethoxydimethylsilane diethoxydimethylsilane, α,ω-dimethoxypolydimethylsiloxanes and α,ω-diethoxypolydimethylsiloxanes.

5. The process of claim 1, wherein the compound providing D units is a cyclosiloxane selected from the group consisting of: hexamethylcyclotrisiloxane; octamethylcyclotetrasiloxane; decamethylcyclopentasiloxane; and dodecamethylcyclohexasiloxane.

6. The process of claim 1, wherein the acid-catalysed, solvent-free depolymerization of the silicone is carried out in a reactor having a volume of at least 5 litres.

7. The process of claim 6, wherein the reactor has a volume of not more than 500,000 litres.

8. The process of claim 1, wherein the acid-catalysed, solvent-free depolymerization of silicone is performed in the temperature range of 30° C. to 150° C.

9. The process of claim 1, wherein, when using a compound providing end groups $M^R$ selected from tetramethyldisiloxane and/or α,ω-dihydrogenpolydimethylsiloxanes, the acid-catalysed, solvent-free depolymerization is performed in the temperature range of 35° C. to 80° C.

10. The process of claim 1, wherein the Brønsted acid is employed in amounts of 0.05 to 3 percent by weight, based on the total silicone content of the reaction system.

11. The process of claim 1, wherein the Brønsted acid is a protic acid having a $pK_A$ of less than −1.30.

12. The process of claim 1, wherein the Brønsted acid is a protic acid having a $pK_A$ of less than −4.90.

13. The process of claim 1 wherein the Brønsted acid is selected from the group consisting of: nitric acid, methanesulfonic acid; p-toluenesulfonic acid; sulfuric acid, heptafluoropropanesulfonic acid; pentafluoroethanesulfonic acid; trifluoromethanesulfonic acid; perchloric acid; chlorosulfonic acid; and sulfonic acid- or perfluoroalkylsulfonic acid-acidified ion-exchange resins.

14. The process of claim 1, wherein the acid-catalysed, solvent-free depolymerization of the silicone is performed at standard pressure 1013 hPa.

15. The process of claim 1, wherein the silicone comprises silicone adhesives and/or silicone sealants.

16. The process of claim 1, wherein the endcapped, liquid siloxanes comprise alkoxysiloxanes, hydrogensiloxanes, chlorosiloxanes, polydimethylsiloxanes and/or vinylsiloxanes having chain lengths of greater than 3 silicon atoms.

17. The process of claim 1, wherein the silicone comprises silicone-contaminated polyolefins, for providing acidic alkoxysilanes, hydrogensiloxanes, chlorosiloxanes, polydimethylsiloxanes and/or vinylsiloxanes having chain lengths of greater than 3 silicon atoms in the course of substantially single stream recovery of the polyolefin.

* * * * *